United States Patent [19]

Kolstad et al.

[11] Patent Number: 4,580,806
[45] Date of Patent: Apr. 8, 1986

[54] PNEUMATIC SUSPENSION SYSTEM

[75] Inventors: Jerome L. Kolstad, Tower; Forrest L. Tagg, Lino Lakes, both of Minn.

[73] Assignee: Tartan Transportation Systems, Inc., Minneapolis, Minn.

[21] Appl. No.: 602,441

[22] Filed: Apr. 20, 1984

[51] Int. Cl.[4] ............................................. B62D 53/06
[52] U.S. Cl. .................................. 280/407; 280/439; 280/441
[58] Field of Search ................. 280/405 A, 407, 439, 280/440, 441, 425 R, 423 R, 438 R; 267/122, 64.27, 64.23, 64.19

[56] References Cited

U.S. PATENT DOCUMENTS

| 2,821,409 | 1/1958 | Chalmers | 280/440 |
| 2,996,312 | 8/1961 | Paul | 280/406 R |
| 3,095,987 | 7/1963 | Sable | 280/440 X |
| 3,137,515 | 6/1964 | Masser | 280/440 |
| 3,208,770 | 9/1965 | Freitas et al. | 280/440 |
| 3,253,840 | 5/1966 | Granning | 280/425 R |
| 3,380,758 | 4/1968 | Granning | 280/425 R |
| 3,580,609 | 5/1971 | Paielle | 280/405 A |
| 3,752,502 | 8/1973 | Ehler | 280/440 |
| 3,884,503 | 5/1975 | Damm | 280/440 |
| 4,279,430 | 7/1981 | Tagg et al. | 280/439 |
| 4,323,264 | 4/1982 | Paielle | 280/405 A |

FOREIGN PATENT DOCUMENTS 959026 5/1964 United Kingdom ............... 280/440

Primary Examiner—John A. Pekar
Attorney, Agent, or Firm—Merchant, Gould, Smith, Edell, Welter & Schmidt

[57] ABSTRACT

A vibration isolation suspension system comprises a support plate mounted on a main support plate on the spaced parallel frame members of a truck tractor. The support plate is mounted on a transverse pivotal axis located near the forward end of the tractor. An air bag suspension system is mounted between the support plate and the main support plate. First and second open-ended cylindrical members are attached to each of the plates and surround the air bag in sliding relationship with one another to minimize lateral shift and roll of the fifth wheel support plate. The main plate is adjustable longitudinally on the tractor frame to adjust the fifth wheel position.

21 Claims, 5 Drawing Figures

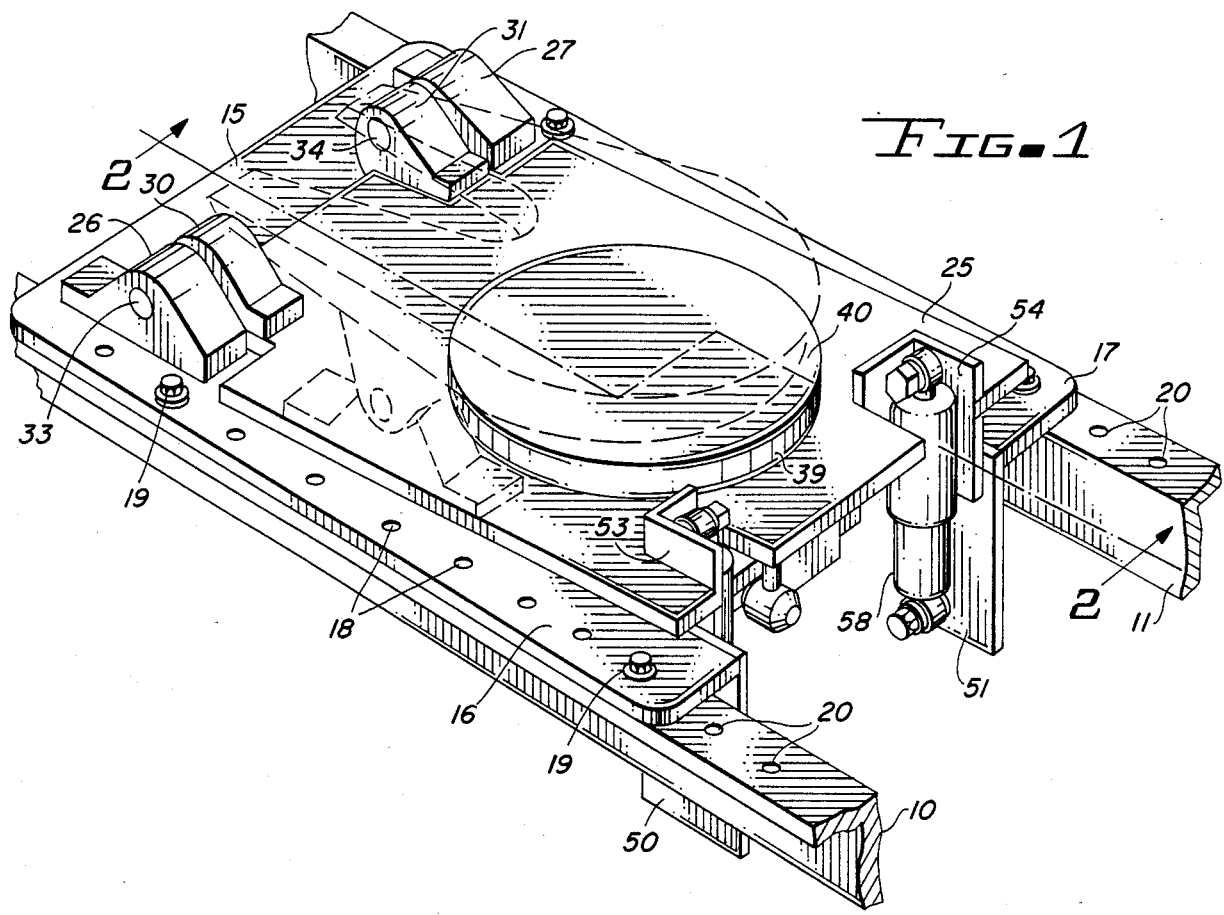
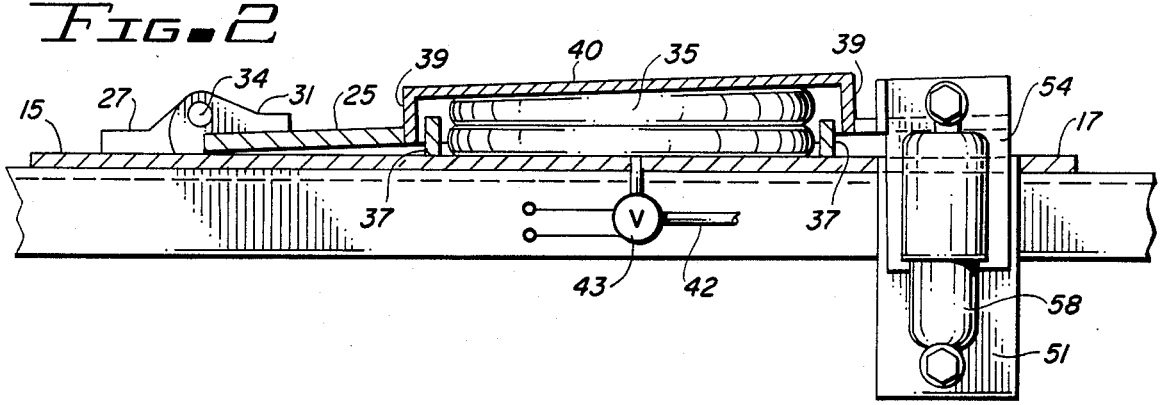
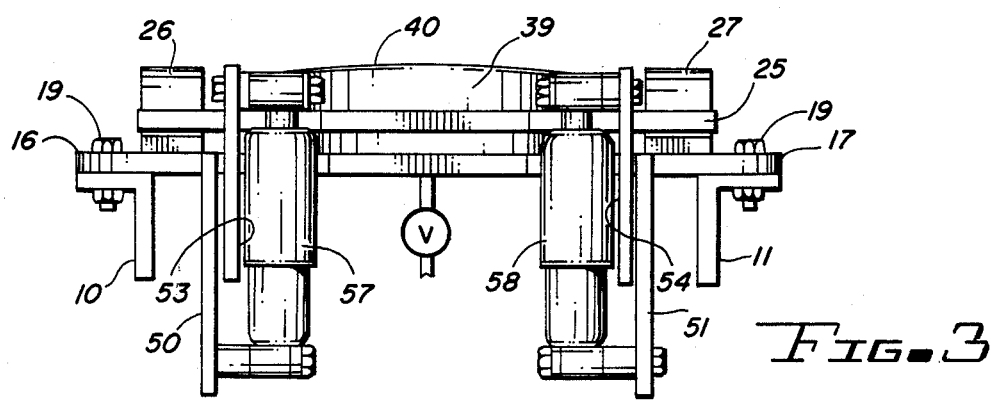

PNEUMATIC SUSPENSION SYSTEM

BACKGROUND OF THE INVENTION

Fifth wheels of the type used to detachably couple the forward end of a semi-trailer to a tractor generally are attached to rail members rigidly secured to the tractor frame. This results in a rigid interconnection between the tractor frame and the forward end of the trailer. As a consequence, substantial shock is transmitted between the trailer and the tractor through the fifth wheel assembly. If a road has severe potholes or bumps in it, loads within the trailer, particularly at its forward end, often are subjected to damage as a result of the jarring shock transmitted between the wheels of the tractor and the trailer. In addition, the tractor itself is subjected to incessant pounding from the trailer through the standard rigid fifth wheel couplings. Finally, the tractor driver is subjected to the same pounding or shock throughout the time he is operating the vehicle. This creates substantial fatigue and frequently results in serious physical problems for the driver.

To alleviate the problems resulting from the incessant pounding of the tractor by the trailer and vice-versa through the fifth wheel assembly, various proposals have been made in the past. For the protection of the driver, the driver's seat in many large tractors is mounted with a resilient suspension between it and the tractor cab. Specialized suspension systems for the rear axles of the tractor also have been designed to minimize the effects of the relative pounding of the tractor and trailer through the fifth wheel assembly. Neither of these approaches, however, serve to isolate the trailer and the tractor frame from one another.

Proposals have been made for providing a resilient mounting for the fifth wheel mounting plate in the form of a support attached across the top of the tractor frame. Various types of resilient steel springs and pneumatic air bag springs have been proposed for this purpose. Most of these proposals require relatively bulky and/or complex structures which are mounted on top of the tractor frame. Examples of fifth wheel mounting assemblies of this type are shown in patents to Masser, U.S. Pat. No. 3,137,515, issued June 16, 1964; Granning U.S. Pat. No. 3,380,758, issued Apr. 30, 1968; Chalmers, U.S. Pat. No. 2,821,409, issued Jan. 28, 1958; and Granning, U.S. Pat. No. 3,253,840, issued May 31, 1966. For the most part, the relatively complex nature of the devices disclosed in these patents and the additional height added to the trailer under all conditions of use when the systems of these patents are employed, have resulted in minimal acceptance of such assemblies.

An assembly which has for its primary purpose the raising and lowering of the fifth wheel relative to the tractor frame is disclosed in the patent to Damm, U.S. Pat. No. 3,884,503, issued May 20, 1975. This patent discloses a pneumatically supported pivoted fifth wheel assembly which is mounted between the frame members of the tractor to permit a limited vertical adjustment of the fifth wheel relative to the tractor frame for the purpose of varying the forces exerted on the tractor by multiple axis semi-trailers when hilly roads are negotiated by the tractor and trailer.

A pneumatic fifth wheel suspension system which overcomes the disadvantages of those disclosed in the other patents mentioned above and which further provides the desired isolation between the tractor and trailer is disclosed in the patent to Tagg and Tourville, U.S. No. Pat. 4,279,430, issued July 11, 1981, and assigned to the same assignee as this application. The system of the Tagg/Tourville '430 patent provides a low profile assembly with a relatively simple construction which has found substantial commercial acceptance. It has been found, however, that the pneumatic air bag of this assembly (and also of the other pneumatic air bag assembly devices of the patents mentioned above) is susceptible to damage from rocks and other objects kicked up by the wheels of the tractor as it moves down the road. Such rocks and other flying objects puncture the air bag, requiring either its repair or its replacement. In addition, the fifth wheel of such assembly, and the assemblies of the other patents mentioned above, usually is mounted on rail members secured to the fifth wheel mounting plate to permit longitudinal adjustment of the location of the center of the fifth wheel for accomodating different trailers. If a particular tractor and trailer combination are to be used throughout the life of such tractor and trailer, the entire assembly may be located on the tractor frame to center the fifth wheel over the pneumatic air bag. If, however, as is frequently the case, different trailers are to be towed by the tractor, longitudinal adjustments of the fifth wheel relative to the fifth wheel mounting plate are made. Frequently, this results in the location of the fifth wheel itself at a point on the fifth wheel mounting plate either between the center of the pneumatic air bag and the pivot for the mounting plate, or off-center toward the rear of the mounting plate. In any event, uneven loading over the pneumatic air bag results, thereby impairing the optimum operating characteristics of the system.

Consequently, it is desirable to provide a fifth wheel mounting assembly which effectively cushions and isolates the tractor and trailer from communicating shock between one another during operation of the tractor-trailer, which is of simple construction, and which overcomes the disadvantages of the prior art discussed above.

BRIEF SUMMARY OF THE INVENTION

Accordingly, it is an object of this invention to provide an improved load suspension structure.

It is another object of this invention to provide an improved resilient fifth wheel suspension system.

It is an additional object of this invention to provide an improved pneumatic fifth wheel suspension system.

It is a further object of this invention to provide an improved pneumatic fifth wheel suspension system which minimizes lateral and longitudinal shift and roll of the fifth wheel support plate and protects the pneumatic air bag from damage.

It is yet another object of this invention to provide an improved longitudinally adjustable fifth wheel suspension system.

In accordance with a preferred embodiment of this invention, a load suspension system comprises a support plate mounted at one end for pivotal movement about an axis extending transversely across the longitudinally extending parallel frame members of the truck tractor. A suspension support member is mounted between the parallel frame members of the tractor and has an air bag suspension means mounted on it beneath the other end of the support plate for normally elevating such other end a predetermined distance above the truck tractor frame. The suspension support member is longitudinally movable on the tractor frame members. First and second cylindrical sections cooperate in a telescoping manner to surround the air bag and to slide relative to one another for providing longitudinal and lateral stability between the support member and the support plate, while at the same time, protecting the air bag from damage.

BRIEF DESCRIPTION OF THE DRAWINGS

FIG. 1 is a perspective view of a preferred embodiment of the invention;

FIG. 2 is a sectional view taken along the Line 2—2 of FIG. 1;

FIG. 3 is an end view of the embodiment shown in FIG. 1;

DETAILED DESCRIPTION

Figure 4:
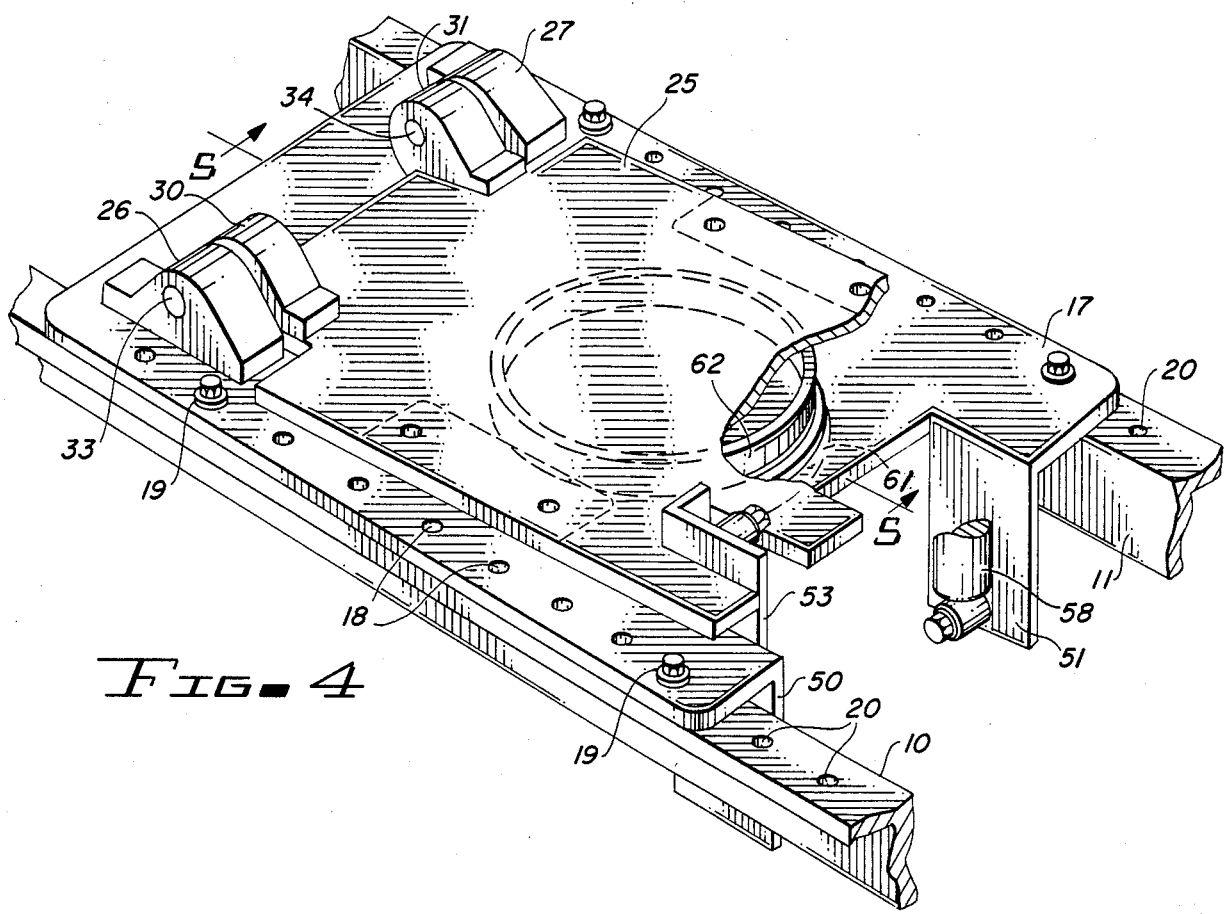
FIG. 4 is a perspective view of another embodiment of the invention.

Reference now should be made to the drawings in which the same or similar components are designated by the same reference numbers throughout the different figures. The fifth wheel mounting assembly, which is shown in the drawings, is constructed to be mounted on a tractor frame behind the rear of the cab of a tractor. The structure of the tractor and the frame on which the apparatus shown in the drawings is mounted is unimportant to an understanding of the invention. Consequently, only a portion of the tractor frame in the form of the two parallel longitudinal side frame members 10 and 11, to which the conventional fifth wheel assembly normally is attached, have been shown in the drawings.

In place of mounting the fifth wheel assembly directly on top of these frame members 10 and 11, as is common practice, the fifth wheel mounting assembly shown in the drawings is used. Reference first of all should be made to the embodiment shown in FIGS. 1, 2 and 3. A generally U-shaped base plate 15 has a pair of edges or legs 16 and 17 which overlie and extend along the length of the tractor frame members 10 and 11. The plate 15 is a flat plate, preferably made of steel, such as T-1 steel having a thickness of ¾ inches. Mounting holes 18 are spaced at uniform intervals along both of the legs 16 and 17 to accomodate mounting bolts 19 which pass through matching holes 20 drilled through the flat top surfaces of the frame members 10 and 11. Typically, the holes 18 and 20 are spaced apart at 4 inch intervals, although other intervals could be used, if desired. In mounting the assemblies shown in the drawings on a truck frame, the desired location of the fifth wheel for the particular trailer to be towed by the tractor is selected by longitudinally adjusting the position of the plate 15 on the frame members 10 and 11. When the desired proper position is determined by aligning the holes 18 with appropriate holes 20 in the frame members 10 and 11, the bolts 19 are passed through the holes and secured in place. As an alternative to this manual adjustment of the plate 15, hydraulic or air-driven positioning of the plate 15 relative to the tractor frame members 10 and 11 may be provided. To facilitate the positioning of the plate 15 by whatever method is selected, suitable lubricants or lubricating surfaces may be provided between the undersurface of the legs 16 and 17 and the upper surface of the frame members 10 and 11 contacted by the legs.

A fifth wheel support plate 25, which also may be made of T-1 steel having a thickness of ¾ inches, is pivotally mounted on the base plate 15. This is accomplished by means of pivot mounting blocks 26 and 27 welded or otherwise attached to the base plate 15 near the left-hand end, as viewed in FIG. 1 of the drawings. Corresponding mounting blocks 30 and 31 are welded or otherwise attached to the upper surface of the plate 25, and a pair of heavy duty steel pivot rods 33 and 34 pass through corresponding openings in the respective pairs of blocks 26/30 and 27/31. The pivot rods 33 and 34 are held in place by any suitable conventional means to permit pivoting of the upper fifth wheel support plate 25 about the rods 33 and 34 relative to the base support plate 15. Depending upon the particular configuration used and the manner of mounting a fifth wheel on the support plate 25, it may be desirable in some cases to use a single pivot rod passing all of the way through all of the support blocks 26/30 and 27/31. The manner of operation, however, is the same as described for the embodiment shown in FIG. 1.

There also is shown in FIG. 1, in dotted lines, a conventional fifth wheel mounting on the top of the plate 25. Whenever a fifth wheel is mounted on the plate 25, however, it is always in the same fixed location on the plate 25 illustrated in FIG. 1. All longitudinal adjustments of the fifth wheel position relative to the tractor frame members 10 and 11 is effected in the manner described above by longitudinally locating the entire base plate 15 in alignment with appropriate holes 20 in the frame members 10 and 11, and thereafter securing the base plate 15 in the selected position to the frame members 10 and 11 by means of the bolts 19. This ability to adjust the entire unit longitudinally on the tractor frame with the fifth wheel mounting always being on the same position on the plate 25 permits a maximum utilization of an air bag suspension isolation of the trailer with respect to the tractor in the manner generally described in Assignee's prior U.S. Pat. No. 4,279,430.

To achieve a fifth wheel hitch between the tractor and the trailer which allows the trailer to float independently of the tractor, the lower side of a pneumatic suspension bag or air bag 35 is mounted on the top of the base plate 15 (as shown most clearly in FIG. 2). A protective steel cylindrical section or ring 37, approximately ⅜ inches thick, completely surrounds the air bag 35 and is welded to or otherwise attached to the upper surface of the plate 15. A circular opening is formed in the top of the fifth wheel support plate 25, and a corresponding slightly larger steel cylindrical section or ring 39 is welded or otherwise securely attached to the circular opening to overlap the ring 37 in a manner most clearly shown in FIG. 2. The circular opening on the top of the ring 39 then is closed with a circular support plate 40, which also is welded to or otherwise securely attached to the upper edge of the ring 39. The top of the air bag 35 then is attached to the plate 40 in a conventional manner.

The air suspension bag 35 is of a type similar to those used as the heavy duty air suspension springs or cushioning members for railroad cars and the like. It is shown in FIG. 2 in its inflated position, where the plate 25 is rotated counterclockwise (as shown in FIGS. 1 and 2) relative to the base plate 15 to elevate the plate 25 two and one-half to three inches above the plate 15 in the region of the central axis of the air bag 35. Air for inflating the air bag 35 is obtained from the conventional tractor air supply system through a supply line 42 under the control of an electrically-operated valve 43. Whenever a trailer is to be hitched or unhitched from the tractor, air is released from the air bag 35, causing the right hand end of the plate 25 to rotate clockwise until the plate 25 rests on top of the extensions 16 and 17 of the base plate 15.

As mentioned previously, a standard tractor trailer fifth wheel assembly is attached to the plate 25 to center it over the axis of the air bag 35. The entire assembly then is positioned to cause the fifth wheel location to be the same as it would normally occupy if it were attached in a standard manner directly to the frame members 10 and 11 of the tractor. It should be noted that the trailer is not elevated any significant amount above the height which it has for a conventional tractor trailer fifth wheel structure, where the fifth wheel assembly is attached directly to the frame of the tractor. The only difference is the thickness of the two plates 15 and 25 ($1\frac{1}{2}$ inches for the present example, where each of these plates is $\frac{3}{4}$ inches thick). This is a relatively insignificant height difference. Consequently, if is necessary for the tractor trailer combination to pass under low overhead structures, the suspension system can be deflated to permit the plate 25 to rest directly on the top surface of the extensions 16 and 17.

Normally, however, the air bag 35 is inflated under control of the operation of the valve 43 to a point where the fifth wheel assembly mounted on the plate 25 for supporting the trailer is elevated to the position shown in FIG. 2. In this position, the weight of the trailer is carried by the air bag 35 which assumes the general shape shown in FIG. 2. This provides significant isolation between the trailer and the tractor to enable the tractor and trailer to work relatively independently of one another. Consequently, the shock normally transmitted between the tractor and trailer through the fifth wheel assembly is significantly reduced, prolonging the mechanical life of the equipment and reducing the possibility of damage to freight carried within the trailer. To prevent overinflation of the air bag 35, conventional sensors and limit switches may be employed to sense the inflation of the bag or the height of the plate 25. In addition, safety pin stops or other limit devices may be provided to prevent lifting of the plate 25 beyond some maximum height. This is important if a driver forgets to release the air from the bag 35 and proceeds to unhitch the trailer. Without some limit to the elevation of the plate 25 relative to the plate 15, significant damage could result to the air bag 35, as well as to other components of the system. Consequently, a simple safety pin stop or pair of stops (not shown) may be provided to preclude any possibility of damage occurring in such an event.

As is readily apparent from an examination of FIG. 2, the rings 37 and 39, in conjunction with the upper surface of the plate 15 and the circular plate 40 completely enclose the air bag 35. This prevents the air bag 35 from being damaged by flying rocks and from undergoing premature deterioration due to sunlight or chemicals, such as salt and the like, which are widely used in colder climates to remove ice and snow from roadways on which the tractor and trailer may be travelling.

In addition to providing this protection for the air bag 35, the circular rings 37 and 39 are located with a close spacing (approximately $\frac{1}{8}$ inch) between them. This space may be provided with or filled with grease or other suitable lubricant, and whenever the relative movements of the tractor and trailer cause forces other than perpendicular forces to occur between the tractor and trailer, the rings 37 and 39 act as wear plates and stabilizing members for twisting forces in any direction which may otherwise subject the air bag 35 to damaging stresses. The rings 37 and 39 stabilize the entire tractor/trailer combination as it moves down the road over rough or uneven terrain, or whenever it is subjected to strong wind forces in any direction.

In addition to the rings 37 and 39, however, a pair of vertically extending flat wear plates 50 and 51 extend downwardly from the ends of the legs 16 and 17, respectively, for engaging, in a close sliding relationship, corresponding wear plates 53 and 54 which are welded to openings or cut-outs in the right-hand end of the plate 25 and depend downwardly from it. The orientation of these pairs of wear plates relative to one another is shown most clearly in FIG. 3; and, as shown in FIGS. 1 and 2, these plates extend longitudinally parallel to the frame members 10 and 11 of the tractor. A pair of conventional shock absorbers 57 and 58 interconnect each of the respective pairs of wear plates 50/53 and 51/54 to dampen oscillations of the air bag spring 35 which take place in the operation of the system.

Figure 5:
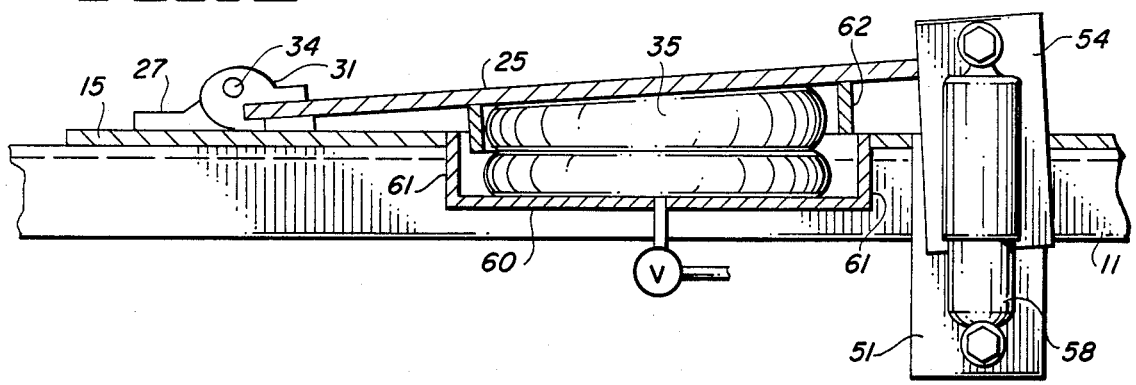
FIG. 5 is a sectional view taken along the Line 5—5 of FIG. 4.

Reference now should be made to FIGS. 4 and 5 which illustrate an embodiment similar in all respects to the embodiment shown in FIGS. 1, 2 and 3, except in which the upper surface of the fifth wheel mounting plate 25 is flat and the air bag 35 is mounted below the plate 15 on a circular support member 60 below a corresponding circular hole in the base plate 15 and attached to a circular ring 61. Located in sliding relationship to the ring 61 is a smaller cooperating ring 62 welded or otherwise suitably attached to the underside of the plate 25 to encase the air bag 35. The rings 61 and 62 cooperate in the same manner as the rings 37 and 39 for the same purposes described above in conjunction with the embodiment of FIGS. 1 through 3. In all other respects, the embodiment of FIGS. 4 and 5 operates in the same manner as the embodiment described previously and shown in FIGS. 1, 2 and 3.

From a consideration of both of the embodiments described above, it also will occur to those skilled in the art that, for some applications, it may be desirable to mount the entire unit on the underside of the front of the trailer. To accomplish this, a provision may be made to spring-load the plate 25 or otherwise bias the plate 25 into engagement with the plate 15 and extensions 16 and 17 when the unit is turned upside down. Then, instead of mounting a fifth wheel assembly on the plate 25, the trailer "kingpin" would be mounted on the plate 25 over the central axis of the air bag 35 for interconnecting a trailer so equipped with a conventional tractor fifth wheel. The operation of the various parts which have been described and their function would be the same as for the fifth wheel plate assembly described above and shown in the two embodiments of FIGS. 1 through 3 and FIGS. 4 and 5, respectively.

The fifth wheel mounting assemblies which have been described above and which are shown in the drawings should be considered illustrative of the invention only and are not to be considered limiting. For example, in the embodiments illustrated, the axis or pivot for the plate 25 is located near the rear end of the tractor frame. This pivot also may be located near the forward or cab end of the tractor frame, if desired. The suspension of the fifth wheel above the frame on the plate 25, by virtue of the operation of the air bag 35, provides the desired isolation between the trailer and the tractor, irrespective of the location of the hinged or pivoted end of the assembly. Various other changes and modifications will occur to those skilled in the art, without departing from the true scope of the invention.

We claim:

1. A fifth wheel mounting system for supporting a fifth wheel on a truck tractor frame including at least first and second spaced-apart longitudinally extending parallel frame members, said mounting system comprising in combination:

a main support plate adapted to be mounted between the parallel frame members;

a fifth wheel support plate disposed in overlying relation to the main plate and mounted for movement relative thereto;

air bag suspension means disposed between the main plate and support plate for elevating the support plate a predetermined distance above the parallel frame members, and for absorbing forces transmitted between the fifth wheel and tractor frame;

a first generally cylindrical member mounted to the main support plate in protective surrounding relation to the lower portion of the air bag suspension means;

a second generally cylindrical member mounted to the fifth wheel support plate in protective surrounding relation to the upper portion of the air bag suspension means;

the first and second cylindrical members being sized and constructed to move relatively in telescoping relation to stabilize the position of said fifth wheel support plate relative to the parallel frame members and to protect said air bag suspension means.

2. The combination according to claim 1 wherein said first and second cylindrical members are made of steel.

3. The apparatus defined by claim 1, wherein:
the first cylindrical member projects upward from the top surface of the main support plate;
the fifth wheel support plate has a circular opening formed therein in overlying relation to the first cylindrical member;
and the second cylindrical member projects upward from said circular opening;
and further comprising a circular top plate mounted to the top of said second cylindrical member.

4. The combination according to claim 3 wherein the diameter of said second cylindrical member is greater than the diameter of said first cylindrical member, and wherein the center lines of said first and second cylindrical members are substantially aligned with one another.

5. The combination according to claim 4 wherein said first and second cylindrical members are made of steel.

6. The combination according to claim 1 wherein said main plate is mounted on the upper surface of the parallel frame members of the truck tractor, and wherein said transverse axis is defined by pivot mounting blocks mounted on said main plate.

7. The combination according to claim 1 wherein the transverse axis about which said fifth wheel support plate is mounted is located near the forward end of the frame of the truck tractor, and the other end of said fifth wheel support plate is located near the rear end of the frame of the truck tractor.

8. The combination according to claim 7 wherein said main plate is mounted on the upper surface of the parallel frame members of the truck tractor, and wherein said transverse axis is defined by pivot mounting blocks mounted on said main plate.

9. The apparatus defined by claim 1, wherein:
the second cylindrical member projects downward from the bottom surface of the fifth wheel support plate;
the main support plate has a circular opening formed therein in underlying relation to the second cylindrical member;
the first cylindrical member projects downward from said circular opening;
and further comprising a circular bottom plate mounted to the bottom of said first cylindrical member, the top plate being disposed below the plane of the upper surface of the parallel frame members.

10. The apparatus defined by claim 1, wherein the support plate is mounted to the main plate at one end thereof for pivotal movement about an axis extending transversely to the parallel frame members.

11. A fifth wheel mounting system for supporting a fifth wheel on a truck tractor frame comprising at least first and second spaced-apart longitudinally extending parallel frame members, said mounting system including in combination:

a main plate mounted for limited movement in a longitudinal direction on the parallel frame members of the truck tractor frame;

a fifth wheel support plate mounted at one end on said main plate for pivotal movement about an axis extending transversely across the first and second parallel frame members;

an air bag resilient suspension means supported on said main plate beneath the other end of said support plate for normally elevating said other end of said support plate a predetermined distance above the parallel frame members.

12. The combination according to claim 11, further including means for securing said main plate in predetermined longitudinal positions on the parallel frame members of the truck tractor following a predetermined longitudinal location thereof on the parallel frame members.

13. The combination according to claim 12 wherein the transverse axis about which said fifth wheel support plate is mounted is located near the forward end of the frame of the truck tractor, and the other end of said fifth wheel support plate is located near the rear end of the frame of the truck tractor.

14. A fifth wheel mounting system for supporting a fifth wheel on a truck tractor frame including at least first and second spaced-apart longitudinally extending parallel frame members, said mounting system comprising in combination:

a fifth wheel support plate mounted at one end for pivotal movement about an axis extending transversely across the first and second parallel frame members;

a suspension means support member mounted between the first and second frame members;

an air bag resilient suspension means supported on said support member beneath the other end of said support plate for normally elevating said other end of said support plate a predetermined distance above the parallel frame members;

at least a portion of said suspension means support member and air bag resilient suspension means being disposed beneath the plane of the upper surface of the first and second parallel frame members;

a first open cylindrical member attached to said support member and surrounding said air bag means;

and a second open cylindrical member attached to said fifth wheel support plate and disposed in telescoping relation with said first cylindrical member when said system is in use to stabilize the position of said fifth wheel support plate relative to the parallel frame members of the truck tractor, and to protect said air bag resilient suspension means.

15. A fifth wheel mounting system for supporting a fifth wheel on a truck tractor frame including at least first and second spaced apart longitudinally extending parallel frame members, said mounting system comprising in combination:

a fifth wheel support plate mounted at one end for pivotal movement about an axis extending transversely across the first and second parallel members;

a suspension means support member mounted between the first and second frame members for limited movement in the longitudinal direction on said parallel frame members;

an air bag resilient suspension means supported on said support member beneath the other end of said support plate for normally elevating said other end of said support plate a predetermined distance above the parallel frame members;

a first open cylindrical member attached to said support member and surrounding said air bag resilient suspension means;

and a second open cylindrical member attached to said fifth wheel support plate and disposed in telescoping relation with said first cylindrical member when said system is in use to stabilize the position of said fifth wheel support plate relative to the parallel frame members of the truck tractor, and to protect said air bag resilient suspension means.

16. The apparatus defined by claim 15, which further comprises means for securing the suspension means support member in predetermined longitudinal positions on the parallel frame members of the truck tractor following a predetermined longitudinal location thereof on the parallel frame members.

17. The combination according to claim 15 wherein said support plate is fifth wheel support plate and the transverse axis about which said fifth wheel support plate is mounted is located near the forward end of the frame of the truck tractor, and the other end of said fifth wheel support plate is located near the rear end of the frame of the truck tractor.

18. A fifth wheel mounting system for supporting a fifth wheel on a truck tractor frame including at least first and second spaced apart longitudinally extending parallel frame members, said mounting system comprising in combination:

a main plate adapted to be mounted between said parallel frame members;

a fifth wheel support plate disposed in overlying relation to the main plate and mounted for relative movement toward and away therefrom;

resilient suspension means disposed between the main plate and support plate for elevating the support plate a predetermined distance above the parallel frame members;

and means for adjustably mounting the main plate to the parallel frame members at desired longitudinal positions thereon.

19. The apparatus defined by claim 18, wherein the parallel frame members each has a longitudinal row of mounting holes formed therein, and the adjustable mounting means comprises:

a row of mounting holes formed along each longitudinal edge of the main plate, each row of mounting holes being disposed for registration with the row of mounting holes in the associated parallel frame member;

and a plurality of mounting bolts inserted in selected registering mounting holes of the parallel frame members and the main plate.

20. The apparatus defined by claim 18, wherein the resilient suspension means comprises an expansible air bag.

21. The apparatus defined by claim 20, wherein the support plate is mounted to the main plate at one end thereof for pivotal movement about an axis extending transversely to the parallel frame members.

* * * * *